DESIGN-REISSUE.
W. H. CLEMES.
Assignor to The Taylor & Boggis Foundry Company.
WICK TUBE AND BURNER PLATE.
No. 11,239. Reissued May 17, 1892.
-FIG. I-
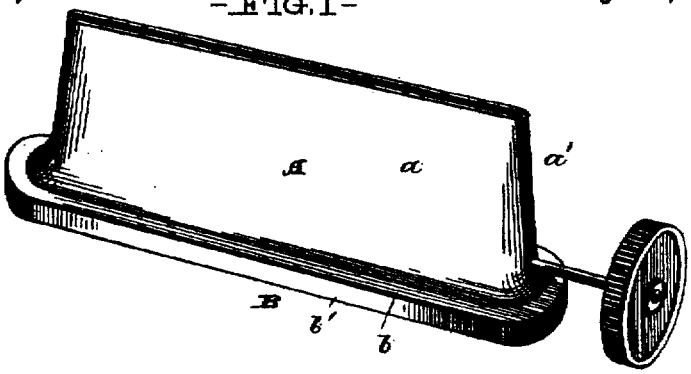
-FIG. II-
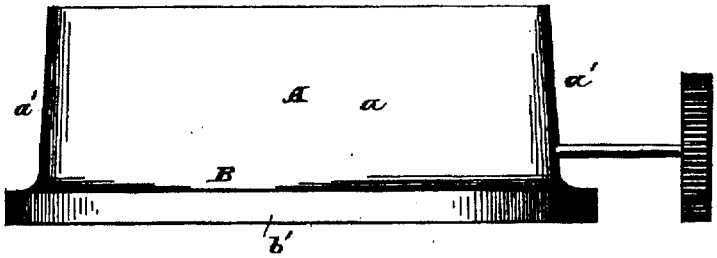
-FIG. III-
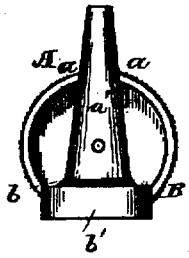
WITNESSES:
J. C. Turner
Wm. Fecher
INVENTOR.
W. H. Clemes
BY Hall and Fay
ATTORNEYS.

UNITED STATES PATENT OFFICE.

WILLIAM H. CLEMES, OF CLEVELAND, OHIO, ASSIGNOR TO THE TAYLOR & BOGGIS FOUNDRY COMPANY, OF SAME PLACE.

DESIGN FOR A WICK-TUBE AND BURNER-PLATE.

SPECIFICATION forming part of Reissued Design No. 11,239, dated May 17, 1892.

Original No. 21,442, dated March 29, 1892, for 14 years. Application for reissue filed April 19, 1892. Serial No. 429,985.

*To all whom it may concern:*

Be it known that I, WILLIAM H. CLEMES, a citizen of the United States, and a resident of Cleveland, county of Cuyahoga and State of Ohio, have invented and produced a new and original Design for Combined Wick-Tubes and Burner-Plates, of which the following is a specification, reference being had to the accompanying drawings, forming part thereof, and in which—

Figure I represents a perspective view of an oblong wick-tube and burner-plate embodying my design; Fig. II, a side elevation, and Fig. III an end elevation.

The leading feature of my design consists in the downwardly-diverging outlines of the sides of the oblong wick-tube, and substantially horizontal outlines for the oblong burner-plate.

In the drawings the letter A indicates the oblong wick-tube, the sides *a* of which have downwardly-diverging outlines, while its ends *a'* have outlines which are at right angles, or nearly so, to the upper and lower edges of the tube. The lower ends of the outlines of the sides and ends merge into the substantially horizontal outlines of the shoulder *b* of the oblong burner-plate B, and said horizontal lines pass into the vertical lines of the sides *b'*.

What I claim is—

A design for an oblong combined wick-tube and burner-plate, comprising the following outlines, viz: downwardly-diverging outlines for the sides of the oblong wick-tube and substantially horizontal outlines for the oblong burner-plate, substantially as set forth.

In testimony that I claim the foregoing to be my invention I have hereunto set my hand this 13th day of April, A. D. 1892.

W. H. CLEMES.

Witnesses:
WM. SECHER,
J. C. TURNER.